United States Patent Office 3,471,894
Patented Oct. 14, 1969

3,471,894
METHOD OF CLEANING SHELLFISH
Eric W. Tasker, Rockport, Mass., assignor to Cape Ann Marine Research Company, Inc., Rockport, Mass., a corporation of Massachusetts
No Drawing. Filed Oct. 25, 1968, Ser. No. 770,830
Int. Cl. A22c 29/00; A23l 1/33, 1/18
U.S. Cl. 17—48                                    10 Claims

ABSTRACT OF THE DISCLOSURE

Shellfish are deshelled by subjecting shellfish in a fluid medium to a rapid lowering of the pressure whereby the shells are rapidly detached from the flesh.

This invention relates to a method for separating the flesh from the shells of crustaceans (shellfish) and, more particularly to deshelling shrimp.

BACKGROUND OF THE INVENTION

The deshelling of crustaceans constitutes one of the most expensive and difficult steps in the marketing of the meat from this type of fish. The principal means employed for deshelling crustaceans generally involves mechanical means which involve shearing, crushing, or abrading the shells. However, such devices are not entirely satisfactory because of the differences in the size of the individual shellfish and because of the damage to the meat as well as the inefficiencies encountered in poor separation of the shell from the flesh which results in flesh being discarded along with the shell. In addition, a plurality of steps are usually employed with fairly elaborate equipment, including, in some methods, hand labor.

Shrimp present particular difficulties; primarily because they are small in size and, thus, the economies of most processes, particularly ones which involve the use of hand labor, or processes which do not deshell in bulk, obviate the use of such processes.

One method employed to more easily remove the shells involves boiling and then drying the shrimp so that the shell becomes brittle and easily removable from the overdried flesh by various mechanical devices. However, this method is not entirely satisfactory because of the lessening of the quality, color, and flavor of the flesh as a result of the drying and then rehydrating steps which are necessary.

Still another method involves the rapid drying of boiled shrimp so that only the shell was dried and no significant loss of water occurred from the flesh, and then opening the shells and applying a pressurized fluid to the flesh to detach it from the shell.

The difficulty in these methods resides in the fact that mechanical equipment is still employed for the crushing or slitting of the shell and that any drying operation at all can be unreliable and detrimental to the flesh. Still further, these methods require that the flesh be precooked, thus, eliminating marketing procedures in which the uncooked flesh would be desirable.

A method has now been found which is not susceptible to the deficiencies of the prior art.

BRIEF SUMMARY OF THE INVENTION

The novel process of the present invention comprises the steps of subjecting the shellfish in a fluid to a first pressure and then rapidly lowering the pressure whereby the shell separates from the flesh as a result of the rapid pressure change. The particular pressure differential is not critical; however, the greater the differential, the more easily the shellfish are deshelled. It is critical, however, that the pressure differential, i.e., the decompression step, be carried out sufficiently rapidly to provide a pressure wave or shock wave of substantially the speed of sound, or greater, in the given fluid medium.

Any suitable apparatus can be employed for carrying out the process of the present invention. Such suitable apparatus includes a closed first chamber in which the shellfish and fluid are pressurized, which chamber includes a quick opening valve to provide the rapid reduction in pressure or a diaphragm adapted to rupture when a predetermined pressure inside the chamber is reached.

DETAILED DESCRIPTION OF THE INVENTION

The novel process of the present invention is suitable for processing any type of shellfish, e.g., shrimp, lobsters, and clams and crabs. The process, however, is particularly suitable for processing shrimp which heretofore has produced particular problems in obtaining the flesh by conventional methods.

The shellfish may be either cooked, partially cooked, or uncooked. In one embodiment where steam is employed both as a fluid and to provide the pressurized atmosphere, cooking is accomplished simultaneously with the removal of the shells.

The shellfish may be packed randomly and densely in the chamber; the process is equally efficient whether the entire chamber is filled or whether only a few shellfish are contained therein.

Other fluids suitable for use in the present invention include, but are not limited to, water, and alcohol. The temperature also is not critical and may range from, for example, a cooking temperature for the shrimp to room temperature or lower. The specific temperature employed, of course, is dependent upon whether or not it is desired to provide a cooking effect to the shrimp or the degree of cooking, if any, desired by the specific pressure employed and the fluid employed. Thus, in the enumeration of the suitable fluids above the term "water" is also intended to include steam as the fluid.

The more rapid the decompression of forces applied to the shellfish, the more efficient is the removal of the shells. The decompression must be sufficiently rapid, however, to set up a shock wave of substantially the speed of sound. It should be understood, however, that a plurality of pressurization-depressurization steps may be employed to the shellfish in the event that the entire shell is not separated from the flesh on the first cycle. In employing a relatively small pressure drop, a plurality of cycles is preferred. A pressure drop of 20 to 30 p.s.i. is preferred.

In carrying out the process of the present invention, the shellfish are placed in a chamber either immersed in the fluid, or suspended above the fluid. The chamber is then closed and pressurized by suitable means for the desired time and at the desired temperature. The chamber is then opened rapidly to provide for quick decompression whereupon the shells are separated from the flesh. The conventional equipment for separating the shells from the flesh may then be employed.

It should be understood that it is not necessary to pressurize the shellfish in the fluid above atmospheric pressure. It is only necessary to provide a pressure differential. Thus, the shellfish and the fluid can be combined in a closed system at atmospheric pressure and then rapidly subjecting them to a drop in pressure as by projecting them into a vacuum chamber (i.e., negative pressure).

The following non-limiting example illustrates the novel process of the present invention.

Example

Four (4) shrimp (approximately 16 grams) were placed in a closed container with about four (4) ounces of water. The chamber was pressurized at 20 p.s.i. and a temperature of 240° F. for 60 seconds whereupon an aluminum diaphragm ruptured thereby rapidly decreasing the temperature and pressure to atmospheric pressure and room temperature. Substantially all of the shells had been detached from the flesh of the shrimp. The same cycle was again repeated and the remainder of the shells were removed leaving the flesh intact.

Thus, the novel process of the present invention provides for the rapid and efficient cleaning of shellfish wherein the flesh remains intact; wherein the flesh may be either cooked or uncooked as desired, and which avoids the necessity for elaborate mechanical deshelling devices which are not entirely adaptable to a wide variety in the size of the shellfish. Thus, a variety of different shellfish such as lobsters, clams, shrimp, and crabs can be processed on the same equipment on a mass production line. No hand feeding, separating, or arranging of the shellfish in any particular position is required. This versatility, of course, is not found in prior art processes The present invention is particularly suitable for the rapid deshelling of small shrimp, e.g., 50 shrimp to the pound.

While we do not wish to be bound by any particular theory of operation of the process, it is believed that the aforementioned shock wave shatters the shell and the fluid, which may be located between the shell and flesh serves to carry off the shell. It is noted that the shell removal occurs even when the entire shell is not intact and even though there are other orifices in the shellfish. Thus, even a small segment of shell attached to the flesh can be separated by the process of the present invention as well as the entire, intact shell.

What is claimed:

1. The method for deshelling shellfish which comprises subjecting said shellfish in a fluid atmosphere to a first pressure and then rapidly lowering the pressure to provide a pressure wave of substantially the speed of sound in said fluid whereby the shells are detached from the flesh.

2. The method as defined in claim 1 wherein said shellfish are shrimp.

3. The method as defined in claim 1 wherein the lowering of the pressure is substantially instantaneous.

4. The method as defined in claim 1 wherein said fluid is water.

5. The method as defined in claim 4 wherein said shellfish are subjected to pressure of 20 p.s.i. at a temperature of 240° F. for about sixty (60) seconds.

6. The method as defined in claim 1 wherein the pressurization-depressurization cycle is repeated.

7. The method as defined in claim 1 wherein said first pressure is substantially atmospheric pressure and the rapid lowering of said pressure is accomplished by subjecting said shrimp and fluid to a negative pressure.

8. The method as defined in claim 1 wherein said fluid is alcohol.

9. The method as defined in claim 2 wherein said shrimp weigh less than 10 grams.

10. The method as defined in claim 1 wherein said first pressure is sufficient to rupture at least one wall of the chamber enclosing the fluid and shellfish thereby rapidly lowering the pressure.

References Cited
UNITED STATES PATENTS 2,978,334    4/1961    Lapeyre   _____ 99—111
3,225,804   12/1965    Cancel   _____ 146—223

LUCIE H. LAUDENSLAGER, Primary Examiner

U.S. Cl. X.R.
99—111; 146—223